US011628769B2

(12) United States Patent
Lavoie et al.

(10) Patent No.: US 11,628,769 B2
(45) Date of Patent: Apr. 18, 2023

(54) VEHICLE MIRROR SYSTEM HAVING TRAILER TOWING ADJUSTMENT

(71) Applicant: Ford Global Technologies, LLC, Dearborn, MI (US)

(72) Inventors: Erick Michael Lavoie, Van Buren Charter Township, MI (US); Stuart C. Salter, White Lake, MI (US); Annette Lynn Huebner, Highland, MI (US); Paul Kenneth Dellock, Northville, MI (US); Marguerite Lynn Kimball, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 646 days.

(21) Appl. No.: 16/785,896

(22) Filed: Feb. 10, 2020

(65) Prior Publication Data

US 2021/0245660 A1 Aug. 12, 2021

(51) Int. Cl.
*B60R 1/00* (2022.01)
*B60R 1/06* (2006.01)
*B60R 1/02* (2006.01)
*B60R 1/12* (2006.01)

(52) U.S. Cl.
CPC .............. *B60R 1/003* (2013.01); *B60R 1/006* (2013.01); *B60R 1/025* (2013.01); *B60R 1/0612* (2013.01); *B60R 2001/1253* (2013.01)

(58) Field of Classification Search
CPC ....... B60R 1/003; B60R 1/025; B60R 1/0612; B60R 2001/1253

USPC ......................................................... 359/843
See application file for complete search history.

(56) References Cited

U.S. PATENT DOCUMENTS

| | | | |
|---|---|---|---|
| 5,132,851 A | 7/1992 | Bomar et al. | |
| 5,541,778 A * | 7/1996 | DeFlorio | B60R 1/025 359/872 |
| 5,719,713 A | 2/1998 | Brown | |
| 5,835,291 A * | 11/1998 | Takayama | B60R 1/025 359/872 |
| 6,264,337 B1 | 7/2001 | Rannells, Jr. et al. | |
| 8,073,594 B2 * | 12/2011 | Lee | G01S 13/87 701/41 |
| 8,192,036 B2 * | 6/2012 | Lee | B60R 1/025 701/49 |
| 10,065,676 B2 * | 9/2018 | Bradley | B60R 1/00 |

(Continued)

FOREIGN PATENT DOCUMENTS

WO 2009002518 A2 12/2008

*Primary Examiner* — Ricky D Shafer
(74) *Attorney, Agent, or Firm* — Lorne Forsythe; Price Heneveld LLP

(57) ABSTRACT

A vehicle mirror system for a vehicle coupled to a trailer is provided. The vehicle mirror system includes first and second mirror assemblies configured to be located on first and second sides of the vehicle, a trailer angle sensor for sensing a hitch angle between the trailer and the vehicle, and a controller for controlling actuation of the first mirror assembly to control a first viewing window of the first mirror assembly for a driver of the vehicle, wherein the first mirror assembly is adjusted to redirect the viewing window to track a feature on the trailer as the trailer articulates relative to the vehicle based on the hitch angle. The second mirror assembly may be controlled to move inwards and downwards.

16 Claims, 5 Drawing Sheets

(56) References Cited

U.S. PATENT DOCUMENTS

| | | | | |
|---|---|---|---|---|
| 10,118,451 | B1* | 11/2018 | Salter | B60R 1/062 |
| 10,529,238 | B2* | 1/2020 | Gesch | B60R 1/0612 |
| 11,305,694 | B2* | 4/2022 | Pomish | B60R 1/074 |
| 2004/0017285 | A1* | 1/2004 | Zielinski | B62D 15/027 |
| | | | | 359/843 |
| 2010/0085652 | A1 | 4/2010 | Crouse | |
| 2014/0358417 | A1* | 12/2014 | Lavoie | B62D 15/027 |
| | | | | 701/300 |
| 2017/0123431 | A1* | 5/2017 | Ghneim | G06V 20/56 |
| 2017/0140228 | A1* | 5/2017 | Lang | B60R 1/002 |
| 2019/0061626 | A1* | 2/2019 | Dupuis | B60R 1/025 |
| 2020/0094743 | A1* | 3/2020 | Carpenter | B60R 1/072 |
| 2020/0346581 | A1* | 11/2020 | Lawson | G06T 7/73 |

* cited by examiner

VEHICLE MIRROR SYSTEM HAVING TRAILER TOWING ADJUSTMENT

FIELD OF THE DISCLOSURE

The present invention generally relates to vehicle mirrors, and more particularly relates to an adjustable mirror system for a vehicle configured for towing a trailer.

BACKGROUND OF THE DISCLOSURE

Automotive wheeled vehicles are typically equipped with left and right side rearview mirrors that are positionable to enable a driver of the vehicle to view the area along the side and rearward of the vehicle. When reversing the vehicle with a trailer attached thereto, the vehicle may move such that the front end of the vehicle may move in a different direction from the trailer to achieve a desired path. In doing so, a driver may view the area behind the vehicle and the trailer using the vehicle rearview mirrors. Due to the angle between the trailer and the vehicle, the trailer may be articulated to a position outside of the normal mirror viewing area such that a driver of the vehicle may be forced to manually adjust the mirror to view certain portions of the trailer. It would be desirable to provide for an enhanced mirror arrangement that enables automatic adjustment of the mirrors in a manner that enables efficient backing up of the trailer with the vehicle.

SUMMARY OF THE DISCLOSURE

According to a first aspect of the present invention, a vehicle mirror system for a vehicle coupled to a trailer is provided. The vehicle mirror system for a vehicle coupled to a trailer includes a first mirror assembly configured to be located on a first side of the vehicle, a trailer angle sensor for sensing a hitch angle between the trailer and the vehicle, and a controller for controlling actuation of the first mirror assembly to control a first viewing window of the first mirror assembly for a driver of the vehicle, wherein the first mirror assembly is adjusted to redirect the viewing window to track a first feature on the trailer as the trailer articulates relative to the vehicle based on the hitch angle.

Embodiments of the first aspect of the invention can include any one or a combination of the following features:
- a second mirror assembly located on a second side of the vehicle, wherein the controller controls the second mirror assembly to control a second viewing window to track a second feature on the vehicle when the trailer is out of view;
- the hitch angle sensor comprises an imaging device for capturing images of the trailer and determining the hitch angle;
- the first mirror assembly tracks the first feature selected by a user;
- the imaging device identifies and tracks the first feature;
- a filter for filtering a mirror position set point;
- the filter comprises a delay time;
- the first mirror assembly is a side rearview mirror assembly located on the first side of the vehicle and the second mirror assembly is a side rearview mirror assembly located on the second side of the vehicle;
- the first mirror assembly is controlled to toggle between a normal mirror viewing position and an adjusted mirror viewing position;
- the controller actuates the first mirror assembly to move the first viewing window downward and outward towards the trailer when the hitch angle increases as the trailer moves outward while moving in reverse, and wherein the controller activates the second mirror assembly to move the second viewing window downward and inward towards the trailer when the hitch angle increases as the trailer moves outward while moving in reverse; and
- the controller controls the first mirror assembly to direct the first viewing window downward and outward towards the trailer and controls the second mirror assembly to direct the second viewing window downward and inward while the vehicle travels forward below a predetermined speed.

According to a second aspect of the present invention, a vehicle mirror system for a vehicle coupled to a trailer is provided. The vehicle mirror system includes a first rearview mirror assembly configured to be located on a first side of the vehicle, a second rearview mirror assembly located on a second side of the vehicle, a trailer angle sensor for sensing a hitch angle between the trailer and the vehicle, and a controller for controlling actuation of the first mirror assembly to control a first viewing window of the first rearview mirror assembly for a driver of the vehicle, wherein the first rearview mirror assembly is adjusted to redirect the first viewing window outward from the first side as the trailer articulates outward from the first side relative to the vehicle based on the hitch angle, and wherein the controller controls the second rearview mirror assembly to adjust a second viewing window track to redirect the second viewing window inward towards the second side when the trailer articulates outward from the first side.

Embodiments of the second aspect of the invention can include any one or a combination of the following features:
- the hitch angle sensor comprises an imaging device for capturing images of the trailer and determining the hitch angle;
- the first rearview mirror assembly tracks a first feature on the trailer selected by a user;
- a filter for filtering a mirror position set point, wherein the filter comprises a delay time;
- the first rearview mirror assembly is controlled to toggle between a normal mirror viewing position and an adjusted mirror viewing position; and
- the controller actuates the first rearview mirror assembly to move the first viewing window downward and outward when the hitch angle increases, and wherein the controller activates the second mirror assembly to move the second rearview viewing window downwards and inwards towards the trailer when the hitch angle increases as the trailer moves outwards.

According to a third aspect of the present invention, a method of controlling rearview mirror assemblies on a vehicle coupled to a trailer is provided. The method includes the steps of providing first and second rearview mirror assemblies on first and second sides of the vehicle, sensing with a trailer angle sensor a hitch angle between the trailer and the vehicle, and controlling with a controller actuation of the first mirror assembly to control a first viewing window of the first mirror assembly for a driver of the vehicle, wherein the first mirror assembly is adjusted to redirect the viewing window to track a feature on the trailer as the trailer articulates relative to the vehicle based on the hitch angle.

Embodiments of the third aspect of the invention can include any one or a combination of the following features:

the step of controlling the second mirror assembly to adjust a second viewing window track a feature on the vehicle when the trailer is out of view; and the first mirror assembly is a side mounted rearview mirror assembly located on the first side of the vehicle and the second mirror assembly is a side mounted rearview mirror assembly located on the second side of the vehicle, wherein the controller actuates the first mirror assembly to move the first viewing window downward and outward when the hitch angle increases, and wherein the controller activates the second mirror assembly to move the second viewing window downwards and inwards towards the trailer when the hitch angle increases as the trailer moves inward.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
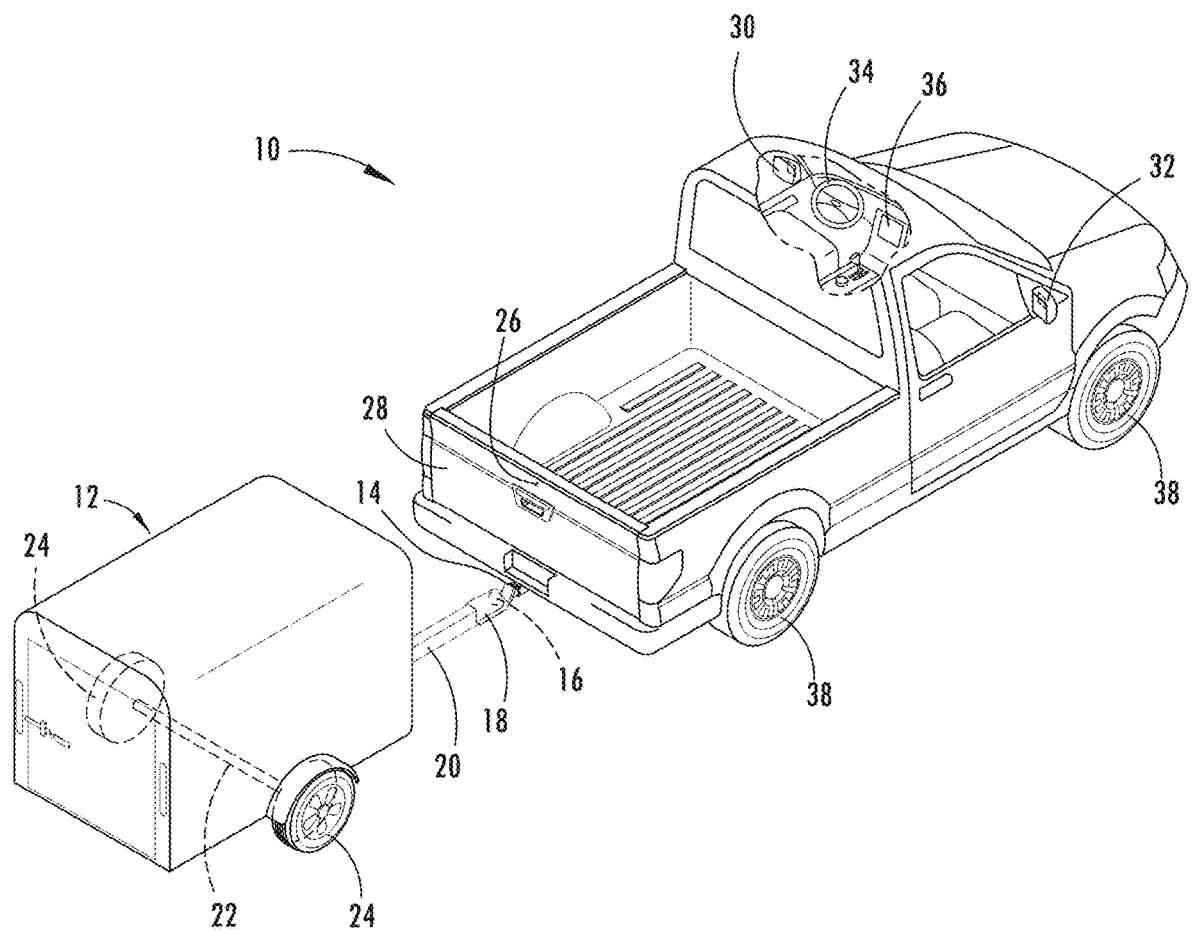
FIG. 1 is a rear perspective view of a vehicle coupled to a trailer and equipped with a mirror system, according to one embodiment.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a mirror control system. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 2A:
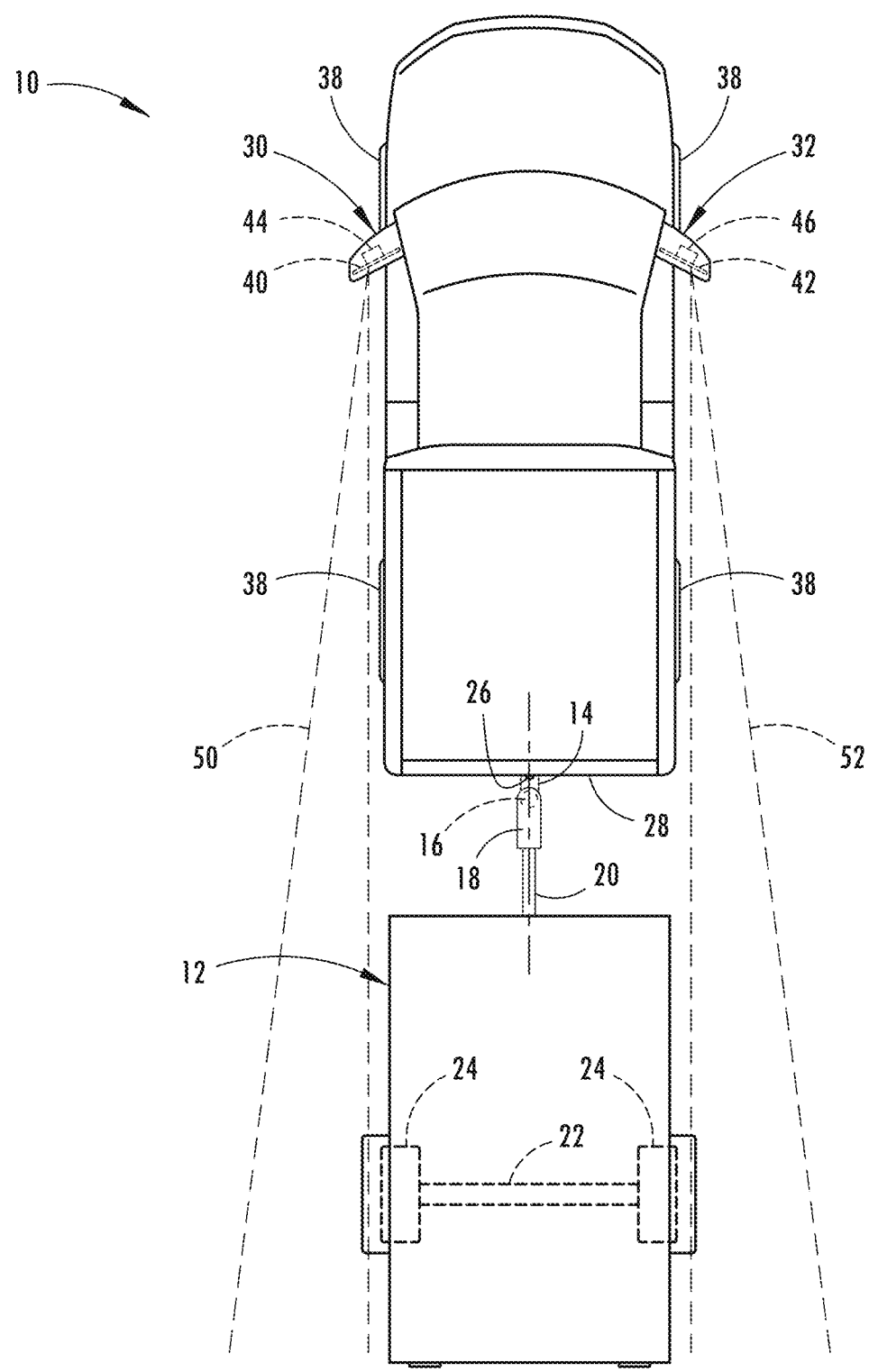
FIG. 2A is a top view of the vehicle and trailer further illustrating a normal viewing area of the left and right rearward facing side view mirror assemblies.
Figure 2B:
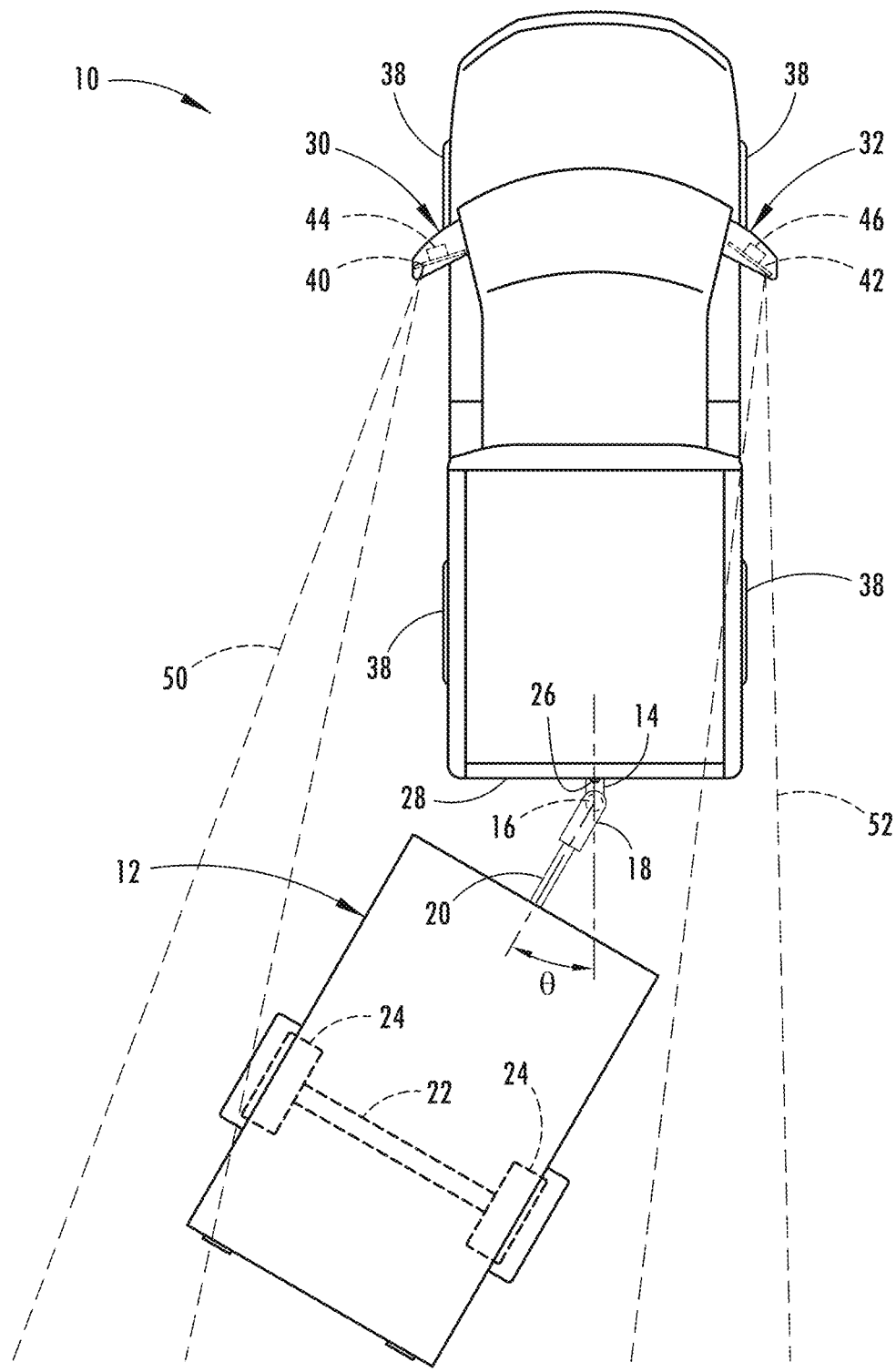
FIG. 2B is a top view of the vehicle and trailer illustrating adjusted positions of viewing areas of the left and right mirror assemblies using the vehicle mirror system.

Referring to FIGS. 1-2B, a wheeled automotive vehicle 10 is generally illustrated having a trailer 12 pivotally connected thereto via a hitch coupling. The vehicle 10 may include any vehicle configured to pivotally connect to a trailer to tow the trailer when the vehicle is driven in a forward gear and to back up the trailer while the vehicle 10 is driven in a reverse gear. The vehicle 10 may include a pick-up truck, sport utility vehicle (SUV), semi-trailer truck, sedan, van or any other vehicle capable of towing a trailer.

The vehicle 10 is shown having a steering wheel 34 that is actuatable by a user acting as a driver to steer the front steerable wheels of the vehicle 10. The vehicle 10 is equipped with pairs of front and rear wheels 38 of which the front steerable wheels may pivot left and right in response to the driver turning the steering wheel 34 counter clockwise and clockwise, respectively. The vehicle 10 also includes a human machine interface (HMI) in the form of a display 36 which may include a touchscreen display for allowing a user to view visual outputs and to enter input commands.

The vehicle 10 is equipped with a plurality of mirror assemblies including a first mirror assembly 30 located on a first side (left or driver side) of the vehicle 10 and a second mirror assembly 32 located on the opposite second side (right or passenger side) of the vehicle 10. The first and second mirror assemblies 30 and 32 are side mounted rearview mirror assemblies located on the exterior side of the vehicle 10 generally in the forward region of the front door and are positioned to enable a driver of the vehicle 10 to view the mirror assemblies through vehicle windows and view the viewing fields directed along the side and rearward of the vehicle 10. Each of the first and second mirror assemblies 30 and 32 includes an actuator, such as a motor and a mirror. The first mirror assembly 30 has a first mirror 40 and a first motor 44 configured to control the directivity of the first mirror 40. The second mirror assembly 32 has a second mirror 42 and a second motor 46 coupled to control the directivity of the second mirror 42. The first and second mirrors 40 and 42 each have a reflective or mirrored surface on the front side and may be planar or slightly convex in shape.

The vehicle 10 is also equipped with a tow hitch 14 which may include a tow ball 16 having a spherical-shaped portion and size configured to be engaged by a hitch coupler 18 located on a trailer tongue 20 of the trailer 12. Other trailer to vehicle pivotable couplings such as a pin coupled to a ring or slot may be employed. As such, the hitch coupler 18 and tow ball 16 coupling enables the trailer 12 to articulate about the pivotable coupling to various articulated positions at various hitch angles θ as the vehicle and trailer combination are driven in the forward and backward directions.

The trailer 12 has a single axle 22 in the embodiment shown and a pair of wheels 24 coupled thereto at opposite ends. It should be appreciated that any type, size and configuration of a trailer may be coupled to the vehicle 10, according to various embodiments. For example, the trailer 12 may have multiple axles and may be coupled to the vehicle 10 at other locations such as a fifth wheel coupling over the rear axle of the vehicle 10.

The vehicle 10 further includes an imaging device, such as a camera 26 shown located at the rear end of the vehicle 10, such as in the tailgate 28. The camera 26 is oriented in a direction rearward of the vehicle 10 to capture images in a region where the trailer 12, particularly the front end side of the trailer, is expected to be located. The images of the trailer 12 captured by the camera 26 are processed to identify one or more features on the trailer 12 and to track the identified one or more features and determine the hitch angle of the trailer relative to the vehicle 10. The one or more features of the trailer 12 may include one or more targets, edges, object features, trailer components or other features of the trailer 12 which are tracked in the captured images as the trailer 12 articulates about the pivotable coupling at various hitch angles θ.

Referring to FIG. 2A, the vehicle 10 and trailer 12 are shown oriented at a hitch angle θ of approximately zero degrees (0°) such that the trailer 12 is aligned straight in-line with the vehicle 10 and the first and second mirror assemblies 30 and 32 are oriented in a normal position as shown by the respective first mirror viewing window 50 and second mirror viewing window 52 viewable by the driver of the vehicle via reflection from the mirrors. Each of the first and second mirror viewing windows 50 and 52 are shown oriented along the side of the vehicle 10 and the trailer 12 such that the left and right sides of the vehicle 10 and the corresponding sides of the trailer 12 may be viewed by a driver of the vehicle via reflection from the first and second mirror assemblies 30 and 32. The normal position of the first and second mirror assemblies 30 and 32 is the mirror position set for normal driving when travelling forward during normal driving conditions. The normal position of the first and second mirror assemblies 30 and 32 may be maintained while the vehicle 10 backs up the trailer 12 in a reverse gear while the hitch angle θ is relatively small or zero.

When backing up the trailer 12 with the vehicle 10, the trailer 12 may pivot or articulate with an increased hitch angle θ which causes the trailer 12 to pivot and turn towards the right side or left side of the vehicle 10 seen as seen FIG. 2B. When this occurs, the first and second mirror assemblies 30 and 32 are controlled to redirect the first and second mirror viewing windows 50 and 52 as seen in the respective mirrors 40 and 42 by the driver. In one embodiment, one of the first and second mirror assemblies 30 and 32, such as the first mirror assembly 30 located on the side of the vehicle 10 where the trailer 12 pivots inward may be adjusted to redirect the first viewing window 50 to track a feature on the trailer 12 as the trailer articulates relative to the vehicle 10 based on the hitch angle θ. The feature tracked on the trailer 12 may include a feature selected by a user, such as the user selected a rear corner of the trailer or a trailer wheel or associated wheel fender of the trailer during a calibration step. According to other embodiments, the feature tracked on the trailer 12 may include a known feature such as a trailer wheel, a trailer light assembly, or a rear side edge of the trailer, based on known dimensions of the trailer 12, such as distance of the trailer axle from the trailer coupler and the hitch ball position relative to the vehicle rear axle. By knowing the dimensions of the trailer 12 and the vehicle 10, and the hitch angle θ, the location of one or more features on the trailer 12 can be tracked and one or both of the first and second mirror assemblies 30 and 32 adjusted to track the feature(s). In addition, one or more cameras, such as camera 26, may be used to identify and track the features. For example, a user could view the captured image on the HMI touchscreen and touch the feature on the touchscreen that is to be trailered.

As also seen in FIG. 2B, the second mirror assembly 32 on the side of the vehicle 10 away from the direction that the trailer 12 is turning into may be adjusted to direct the second mirror viewing window 52 inward towards the vehicle 10 to view a greater amount of the rear end of the vehicle 10 in the area immediately along the side and behind the vehicle 10. Additionally, the second mirror viewing window 52 may be directed downward to view a greater area of the ground of the vehicle 10 to enable the driver of the vehicle 10 to view obstacles that may be immediately behind the vehicle 10 and trailer 12.

Figure 3:
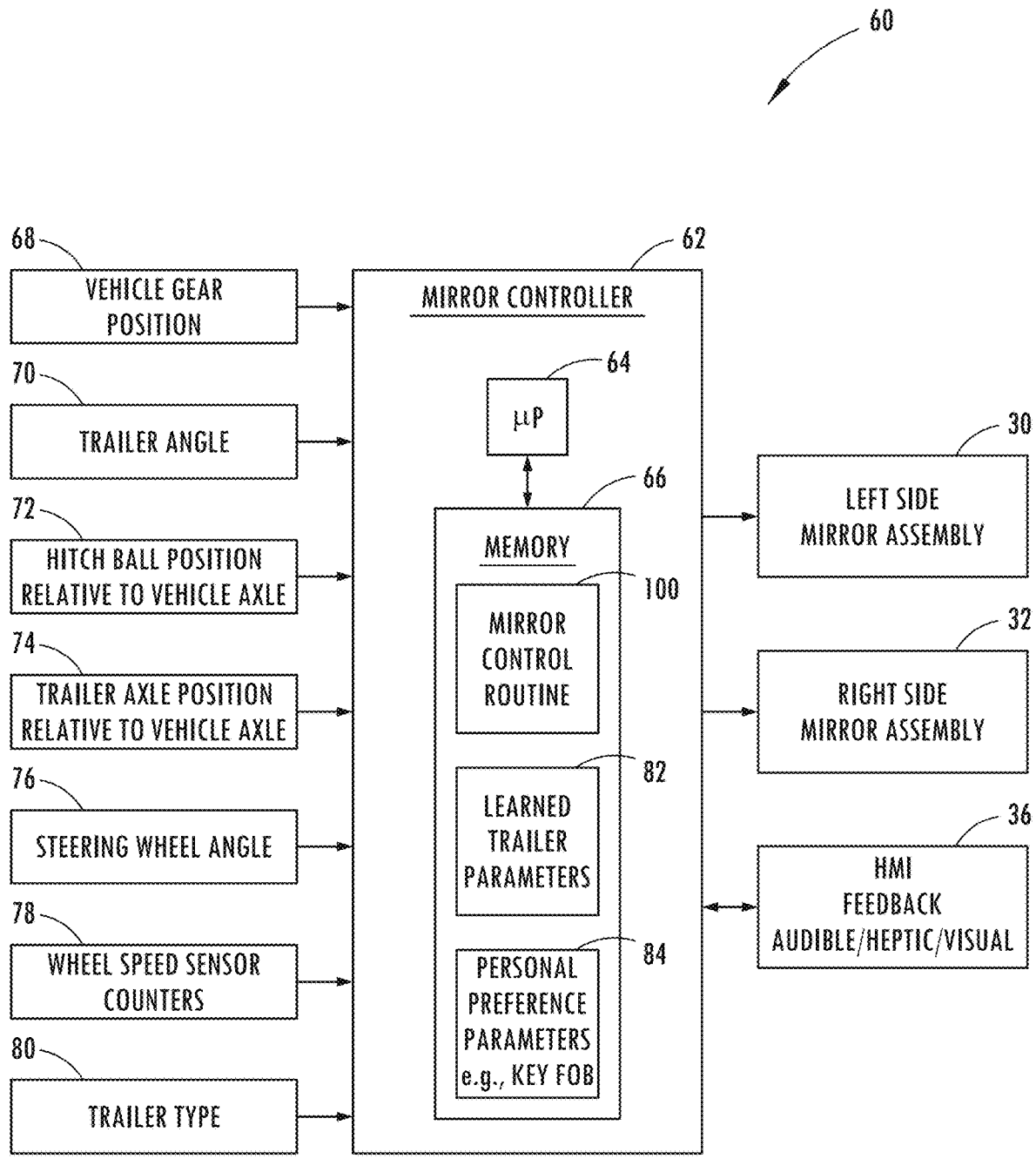
FIG. 3 is a block diagram of the vehicle mirror system, according to one embodiment.

The mirror control system 60 is illustrated further in FIG. 3 having a mirror controller 62. The mirror controller 62 may be a shared or dedicated controller having a microprocessor 64 and memory 66 and/or other analog and/or digital circuitry. Stored within memory 66 and executed by the microprocessor 64 is a mirror control routine 100, learned trailer parameters 82 and personal preference parameters 84. The learned trailer parameters 82 may include dimensions of the trailer that are learned during use of the vehicle and trailer combination and may include dimensions entered by a user. The personal preference parameters 84 may include personalized mirror settings, seat settings and other personalized settings which may be communicated to the vehicle via a remote device such as a key fob. The mirror controller 62 receives the various inputs which include the vehicle gear position 68, the trailer angle 70 as determined from the captured images, a hitch ball position relative to the vehicle axle 72, a trailer axle position relative to the vehicle axle 74, a steering wheel angle 76, wheel speed sensor counters 78 and trailer type information 80. The mirror controller 62 processes the various inputs with the mirror control routine 100 and generates outputs to control the left side mirror assembly 30, the right side mirror assembly 32, and the HMI, e.g., display 36, to provide feedback, such as audible, haptic and visual feedback.

Figure 4:
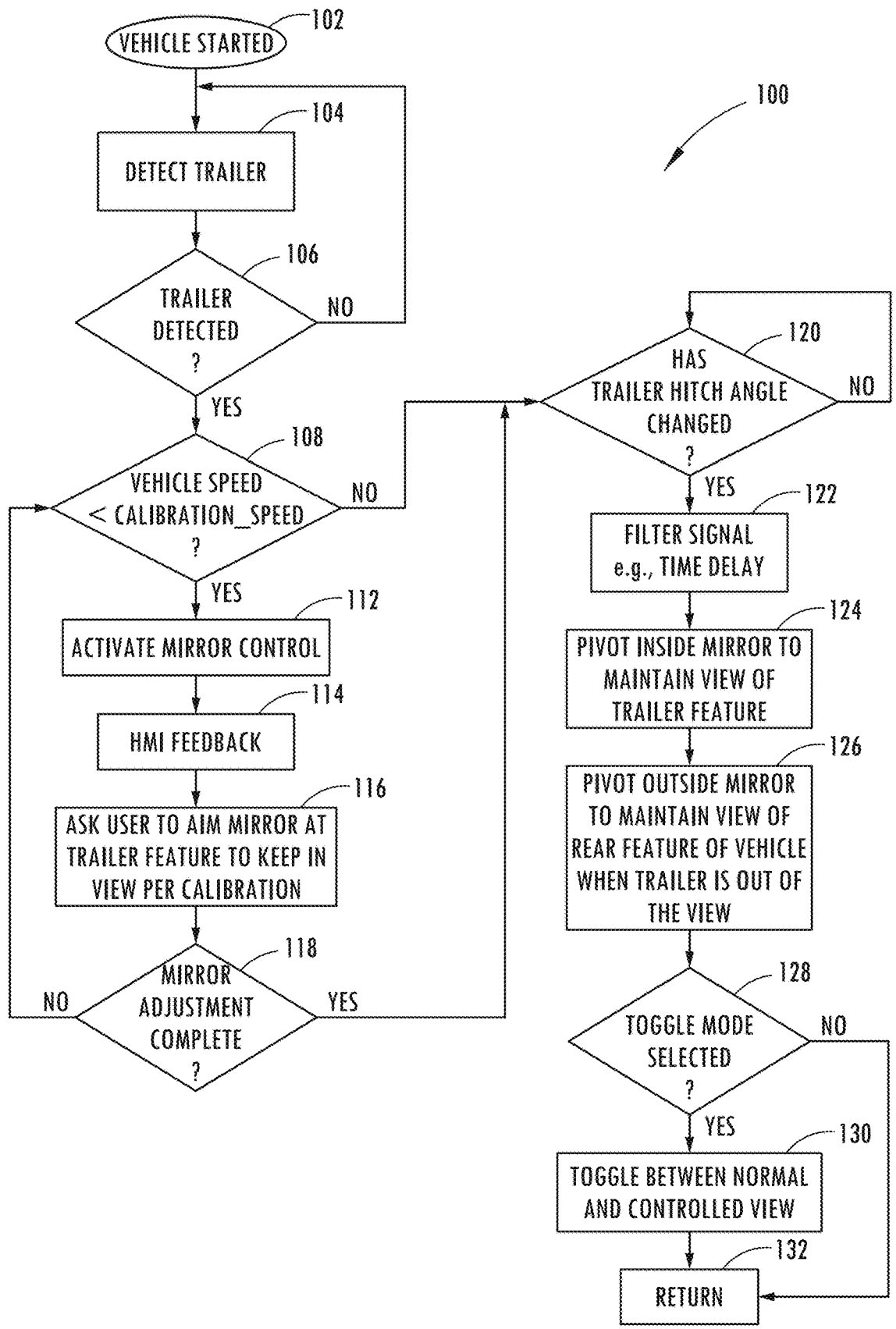
FIG. 4 is a flow diagram illustrating a routine for controlling the vehicle mirror system, according to one embodiment.

The mirror control routine 100 is illustrated in FIG. 4, according to one embodiment. Routine 100 begins at step 102 when the vehicle is started and proceeds to step 104 to detect a trailer. A trailer can be detected based on identifying a trailer in the captured images coupled to the vehicle or detecting an electrical trailer wire connection with the vehicle trailering wire harness or a user input, e.g., a touchscreen input, indicating a trailer coupling. Next, at decision step 106, routine 100 determines if a trailer has been detected coupled to the vehicle and, if not, returns at step 110. Once a trailer is detected coupled to the vehicle, routine 100 proceeds to decision step 108 to determine if the vehicle speed is less than a calibration speed, such as 0 or 5 mph. If the vehicle speed is greater than or equal to the calibration speed, routine 100 returns at step 110. If the vehicle speed is below the maximum speed, routine 100 proceeds to step 112 to activate the adjustable mirror control and then provides feedback via the HMI 114 to indicate that the trailer control mode is activated. Once activated, routine 100 will proceed to a calibration step 116 to prompt a user to adjust and aim the mirror of each mirror assembly at a trailer feature that is to be kept in view and tracked by the driver during operation of the mirror control. Next, at decision step 118, routine 100 determines if the calibration mirror adjustment is complete and, if not, returns to step 108.

Once the calibration mirror adjustment is complete, routine 100 proceeds to decision step 120 to determine if the trailer hitch angle has changed. If the trailer hitch angle has not changed, routine 100 waits for a change in the hitch angle. If the hitch angle has changed, routine 100 proceeds to step 122 to filter the hitch angle signal so as to prevent immediate changes in the orientation of the mirror. This may be achieved by providing a time-delay, such as 300 milliseconds, to provide hysteresis such that the mirror control lags behind the hitch angle detection. Next, at step 124, routine 100 rotates the mirror of the mirror assembly on the side of the vehicle in which the trailer is turning to maintain the viewing of the trailer feature as the trailer feature moves further away from the side of the vehicle. Next, at step 126, routine 100 rotates the outside mirror of the other mirror assembly to maintain the view of a rear feature (e.g., rear corner) of the vehicle when the trailer moves inwards and behind the vehicle and is out of view. In addition to turning the first and second mirror assemblies inwards toward the direction that the trailer is moving, the mirrors may be adjusted downwards to better view the ground proximate the rear of the vehicle and the ground behind the vehicle and near the trailer.

Routine 100 may further includes decision step 128 which determines whether a toggle mode is selected. The toggle mode enables the mirror in each of the first and second mirror assemblies to toggle and thereby switch between the normal field of view and the controlled field of view. If the toggle mode is not selected, the routine ends at step 132. If the toggle mode is selected, the first and second mirror assemblies 30 and 32 are controlled to toggle the first and second mirrors to move the viewing fields between the normal and the controlled fields of view before returning at step 132.

The mirror control system 60 advantageously uses the various inputs to estimate the change in position of one or more select targets, such as rear tire(s) and/or rear corner of the trailer which is reflected by a mirror in the corresponding mirror assembly to the driver and automatically pivots the mirror assembly on the side of the vehicle toward the direction the trailer is moving to track such feature and further pivots the other mirror assembly inward and downward to better view the vehicle and ground behind the vehicle. This results in the first and second mirror assemblies 30 and 32 providing an enhanced width view and lower viewing region onto the ground as the trailer angle increases and may provide a lower view for short trailers versus long trailers. On longer trailing mirrors that extend outward a greater distance, the mirrors may be pivoted to provide a view of the edge of the tire and/or rear corner of the trailer. For example, when reversing at a zero or small trailer angle, it may be possible to see the rear tires on each side of the trailer along with the ground along the projected path of the vehicle. When the critical edges of the trailer are no longer possible to view in a particular mirror, the mirror may automatically be directed to reflect a view of the edge of the rear tire of the vehicle and/or rear corner of the vehicle while maximizing the view of the surrounding road along the projected path of the vehicle.

It should further be appreciated that trailer parameters, such as the position of the trailer tire(s) and the trailer pivot relative to the vehicle may be learned while driving, may be provided by a trailer back-up assist system, or may be provided directly by the driver or other user through the HMI. The parameters may be stored with a trailer identity provided by the driver or detected using image data from one or more sensors such as a camera, radar, ultrasound, or LIDAR. The mirror control system may automatically retrieve trailer parameters stored in memory when the identity of the trailer is detected automatically or selected from a menu by the user (e.g., driver). The user may also choose to have default trailer parameters automatically selected by the mirror control system. Furthermore, the user may choose to have the trailer identity and parameters automatically selected as a function of location, weather, time and/or day.

In some use driving scenarios, the driver may pull the vehicle towing the trailer forward while in a forward gear a limited distance at low speed to help maneuver the trailer in reverse. Therefore, if forward gear is engaged after the mirror control routine has been controlling the vehicle in reverse gear, the mirror control system 60 may continue to control the mirrors described until the vehicle is driven above a predetermined distance, speed threshold, and/or time threshold. The thresholds may be configured by the driver, according to one embodiment. Once a threshold has been exceeded, the mirrors may return to the normal position for forward driving in order to provide a normal view of traffic along the flank of the vehicle and trailer.

It should further be appreciated that the user may be provided with an interface to calibrate the mirror in order to adjust the amount of the trailer and/or vehicle that is in view by the driver as well as how much of the ground is in view. For example, some trailer cargo such as a boat, may cause additional overhang relative to the trailer tires. Therefore, it may be advantageous to have multiple calibrations stored for a particular trailer. The calibrations may be chosen by the user or by chosen by the mirror control system as a function of location, weather, time and/or day. The mirror control system may also employ machine learning with the available sensor data to identify the type of cargo present. The sensor data may be from a camera or other proximity sensors. The mirror control system may employ image processing techniques, such as edge detection, feature detection and/or optical flow to distinguish the edges of the cargo, trailer and vehicle.

Further, the driver may configure whether the first and second mirror assemblies are allowed to yaw and/or pitch in response to trailer movement. The ability to configure or operate the mirror control system may be a function of the driver identify, active key identity, and mykey status. User configurable values may be a function of location, weather, time and/or the like.

Accordingly, the mirror control system advantageously provides for controlled adjustment of the exterior rearview side mirrors to track a trailer towed by the vehicle, particularly in reverse, as the trailer articulates relative to the vehicle. This allows for an enhanced viewing of the trailer and rear of the vehicle during the reversing maneuvering.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle mirror system for a vehicle coupled to a trailer, comprising:
    a first mirror assembly configured to be located on a first side of the vehicle;
    a second mirror assembly located on a second side of the vehicle;
    a trailer angle sensor for sensing a hitch angle between the trailer and the vehicle; and
    a controller for controlling actuation of the first mirror assembly to control a first viewing window of the first mirror assembly for a driver of the vehicle, wherein the first mirror assembly is adjusted to redirect the viewing window to track a first feature on the trailer as the trailer articulates relative to the vehicle based on the hitch angle, wherein the controller controls the second mirror assembly to control a second viewing window to track a second feature on the vehicle when the trailer is out of view, wherein the controller actuates the first mirror assembly to move the first viewing window downward and outward towards the trailer when the hitch angle increases as the trailer moves outward while moving in reverse, and wherein the controller activates the second mirror assembly to move the second viewing window downward and inward towards the trailer when the hitch angle increases as the trailer moves outward while moving in reverse.

2. The vehicle mirror system of claim 1, wherein the angle sensor comprises an imaging device for capturing images of the trailer and determining the hitch angle.

3. The vehicle mirror system of claim 2, wherein the first mirror assembly tracks the first feature selected by a user.

4. The vehicle mirror system of claim 3, wherein the imaging device identifies and tracks the first feature.

5. The vehicle mirror system of claim 1 further comprising a filter for filtering a mirror position set point.

6. The vehicle mirror assembly of claim 5, wherein the filter comprises a delay time.

7. The vehicle mirror system of claim 1, wherein the first mirror assembly is a side rearview mirror assembly located on the first side of the vehicle and the second mirror assembly is a side rearview mirror assembly located on the second side of the vehicle.

8. The vehicle mirror system of claim 1, wherein the first mirror assembly is controlled to toggle between a normal mirror viewing position and an adjusted mirror viewing position.

9. The vehicle mirror system of claim 1, wherein the controller controls the first mirror assembly to direct the first viewing window downward and outward towards the trailer and controls the second mirror assembly to direct the second viewing window downward and inward while the vehicle travels forward below a predetermined speed.

10. A vehicle mirror system for a vehicle coupled to a trailer, comprising:
    a first rearview mirror assembly configured to be located on a first side of the vehicle;
    a second rearview mirror assembly located on a second side of the vehicle;
    a trailer angle sensor for sensing a hitch angle between the trailer and the vehicle; and
    a controller for controlling actuation of the first mirror assembly to control a first viewing window of the first rearview mirror assembly for a driver of the vehicle, wherein the first rearview mirror assembly is adjusted to redirect the first viewing window outward from the first side as the trailer articulates outward from the first side relative to the vehicle based on the hitch angle, and wherein the controller controls the second rearview mirror assembly to adjust a second viewing window track to redirect the second viewing window inward towards the second side when the trailer articulates outward from the first side, wherein the controller actuates the first rearview mirror assembly to move the first viewing window downward and outward when the hitch angle increases, and wherein the controller activates the second mirror assembly to move the second rearview viewing window downwards and inwards towards the trailer when the hitch angle increases as the trailer moves outwards.

11. The vehicle mirror system of claim 10, wherein the angle sensor comprises an imaging device for capturing images of the trailer and determining the hitch angle.

12. The vehicle mirror system of claim 11, wherein the first rearview mirror assembly tracks a first feature on the trailer selected by a user.

13. The vehicle mirror system of claim 10 further comprising a filter for filtering a mirror position set point, wherein the filter comprises a delay time.

14. The vehicle mirror system of claim 10, wherein the first rearview mirror assembly is controlled to toggle between a normal mirror viewing position and an adjusted mirror viewing position.

15. A method of controlling rearview mirror assemblies on a vehicle coupled to a trailer, comprising:
- providing first and second rearview mirror assemblies on first and second sides of the vehicle;
- sensing with a trailer angle sensor a hitch angle between the trailer and the vehicle; and
- controlling with a controller actuation of the first mirror assembly to control a first viewing window of the first mirror assembly for a driver of the vehicle, wherein the first mirror assembly is adjusted to redirect the viewing window to track a feature on the trailer as the trailer articulates relative to the vehicle based on the hitch angle, wherein the first mirror assembly is a side mounted rearview mirror assembly located on the first side of the vehicle and the second mirror assembly is a side mounted rearview mirror assembly located on the second side of the vehicle, wherein the controller actuates the first mirror assembly to move the first viewing window downward and outward when the hitch angle increases, and wherein the controller activates the second mirror assembly to move the second viewing window downwards and inwards towards the trailer when the hitch angle increases as the trailer moves inward.

16. The method of claim 15 further comprising the step of controlling the second mirror assembly to adjust a second viewing window to track a feature on the vehicle when the trailer is out of view.

\* \* \* \* \*

UNITED STATES PATENT AND TRADEMARK OFFICE
CERTIFICATE OF CORRECTION

| | | |
|---|---|---|
| PATENT NO. | : 11,628,769 B2 | Page 1 of 1 |
| APPLICATION NO. | : 16/785896 | |
| DATED | : April 18, 2023 | |
| INVENTOR(S) | : Erick Michael Lavoie et al. | |

It is certified that error appears in the above-identified patent and that said Letters Patent is hereby corrected as shown below:

In the Claims

Column 10:
Claim 2, Line 5;
After "the" insert --hitch--
Claim 11, Line 59;
After "the" insert --hitch--

Signed and Sealed this
Seventh Day of November, 2023

Katherine Kelly Vidal
*Director of the United States Patent and Trademark Office*